United States Patent [19]

Nurmi et al.

[11] Patent Number: 4,687,935
[45] Date of Patent: Aug. 18, 1987

[54] LIQUID SCINTILLATION COUNTER

[75] Inventors: Jarmo Nurmi, Kuusisto; Kenneth Rundt; Timo Oikari, both of Turku, all of Finland

[73] Assignee: Wallac Oy, Turku, Finland

[21] Appl. No.: 782,462

[22] Filed: Oct. 1, 1985

[30] Foreign Application Priority Data

Nov. 9, 1984 [SE] Sweden ............................... 8405620

[51] Int. Cl.$^4$ ............................................... G01T 1/20
[52] U.S. Cl. .............................. 250/361 R; 250/328; 250/366
[58] Field of Search ............ 250/328, 366, 369, 361 R

[56] References Cited

U.S. PATENT DOCUMENTS

| | | | |
|---|---|---|---|
| 3,772,512 | 11/1973 | Laney | 250/366 |
| 4,031,392 | 6/1977 | Giraud et al. | 250/328 |
| 4,181,855 | 1/1980 | Horrocks | 250/328 |
| 4,418,282 | 11/1983 | Horrocks | 250/328 |

*Primary Examiner*—Janice A. Howell
*Attorney, Agent, or Firm*—Fisher, Christen & Sabol

[57] ABSTRACT

The invention relates to a liquid scintillation counter comprising at least two photodetectors (2,3) for viewing a scintillation solution (1) in which both real multiphoton events and single photon events take place, and producing logic pulses and amplitude pulses in correspondence to these events, the amplitude of these amplitude pulses being a function of the number of photons that reach the photodetectors (2,3) for each of said events. According to the invention there are provided means (10) for delaying the logic pulses from one of said photodetectors, means (11) for either delaying or prolonging the amplitude pulses from the same photodetector, a coincidence analyzer for analyzing by means of the undelayed logic pulses and said delayed logic pulses whether said delayed or prolonged amplitude pulses are coincident within a predetermined coincidence resolving time with the undelayed or prolonged amplitude pulses from the other photodetector, and means for determining the number of these coincidences in a plurality of pulse amplitude intervals.

1 Claim, 2 Drawing Figures

4,687,935

LIQUID SCINTILLATION COUNTER

TECHNICAL FIELD

The invention relates to a liquid scintillation counter comprising at least two photodetectors for viewing a scintillation solution in which both real multiphoton events and single photon events take place, and for producing logic pulses and amplitude pulses in correspondence to these events, the amplitude of these amplitude pulses being a function of the number of photons that reach the photodetectors for each of said events.

DESCRIPTION OF PRIOR ART

Liquid scintillation counting is a widely used method for determining the concentration, or decay rate, of one or more radioactive isotopes in solution. The scintillation phenomenon is a result of excitation of organic molecules in collisions between these molecules and a fast electron, ejected by the nucleus in the decay process or produced by γ-quantum through Compton scattering. As these excited molecules return to their ground state they emit photons which may be detected by photodetectors, e.g. photomultiplier tubes, or other photosensitive devices. Most isotopic decays result in more than one photon emitted in a very narrow interval of time. These events will be referred to as multiphoton events. In order to reduce the background originating from thermal noise of the photomultiplier tube, most liquid scintillation counters today have two photomultiplier tubes viewing the same scintillation sample, and count only pulses which occur within a certain time interval, equal to the coincidence resolving time. Liquid scintillation counting is afflicted with a number of problems, one of which is quenching. This is a phenomenon whereby the number of scintillation photons per decay is decreased, resulting in both a shift of the pulse height spectrum to lower values and a decrease in the counting efficiency. In order to convert the measured count rate into activity, the counting efficiency must be known. As this varies from sample to sample, it must be determined for each sample at a time. Counting efficiency can be determined by comparing the pulse height spectrum, or some quench parameter calculated from it, with the pulse height spectra, or quench parameters, of standards having known counting efficiency. In order to determine the counting efficiency accurately in this manner the pulse height spectrum should represent only coincidence pulses belonging to isotopic decays.

One of the most common phenomena that may perturb the pulse height spectrum and lead to incorrect counting efficiencies is random events belonging to chemiluminescence reactions. In each chemiluminescence reaction only one photon is produced and in a coincidence measurement using a plurality of photomultipliers this photon would not be detected, but as the number of reactions increases, there will be a chance that two or more photons, from a number of reactions, will coincide during the coincidence resolving time. At moderate intensities the chance of having more than two photon coincidences is quite small and the chemiluminescence phenomenon will cause a peak centered around the pulse height corresponding to two photons. At higher chemiluminescence intensities the chance of coincidences between more than two photons increases and the spectrum produced by chemiluminescence will spread up to higher energy regions. The perturbation of the isotope decay spectrum is hence not constant but depends on chemiluminescence intensity. In the forthcoming text this phenomenon will be referred to as random coincidence between multiple single photon events.

There are two different methods known to measure the degree of chemiluminescence. One of the two methods to quantify chemiluminescence makes use of the equation $$N_c = 2 \cdot \tau \cdot N_1 \cdot N_2$$

where $N_c$ is the random count rate detected in coincidence when the coincidence resolving time is equal to $\tau$, and $N_1$ and $N_2$ are the rates of independent pulses from each of the two photomultipliers. This method will render the total number of random coincidences in the whole energy interval from two photons upward.

The other method to determine the random count rate originating in chemiluminescence is the delayed coincidence method as described by B. H. Laney in U.S. Pat. No. 3,772,512. Typically, in coincidence determinations the amplitude pulses from the photomultipliers are fed through preamplifiers producing fast logic pulses which are taken to a coincidence analyser. The first logic pulse to arrive opens a coincidence gate which stays open for the coincidence resolving time, during which a logic pulse must arrive from the other photomultiplier in order to produce a coincidence situation. In Laney's delayed coincidence method the logic pulse from either of the two preamplifiers is delayed by a certain fixed time and thereafter taken to a coincidence analyser together with a possible prompt pulse from the other amplifier. In this case the liquid scintillation counter contains two coincidence analysers that must have exactly the same coincidence resolving time. In this method the delay circuit triggers a scaler that counts the number of random coincidences during counting time. Thus the method gives the number of counts in the whole energy interval from two photons upwards.

In both methods mentioned above, in order to correct the count rate in certain windows, the proportion of the chemiluminescence spectrum falling within these windows must be known. This can be solved by storing a typical chemiluminescence spectrum in the counter memory, scaling the integral of this spectrum to the number of chemiluminescence counts detected and thereafter either subtracting the whole scaled chemiluminescence spectrum from the prompt coincidence spectrum or only subtracting the counts in the respective energy windows.

Both of the methods mentioned above may in theory work equally well when determining the total number of random coincidences in the whole energy range. However, the use of a typical chemiluminescence spectrum stored in the counter to correct the prompt spectrum is not sensible, because the chemiluminescence spectrum varies with intensity. At low intensities it consists mostly of two-photon pulses, but at higher intensities the spectrum often contains appreciable amounts of multi-photon pulses. Moreover, at high photon intensities the current flow through the photomultipliers increases, with a decrease in gain as a consequence. This also distorts the pulse height spectrum.

The error in correcting count rate can be reduced by counting in very wide windows, from two photon pulses upwards, but the pulse height spectrum cannot be used for quench determination as it contains both isotopic decay events and chemiluminescence events.

DISCLOSURE OF INVENTION

The object of the present invention is to make it possible in a liquid scintillation counter to determine the random coincidence pulse height spectrum produced in a liquid scintillation solution by single photon events, in order to determine the coincidence pulse height spectrum produced in said sample by multiphoton events only.

This is attained in the liquid scintillation counter according to the invention in that there are provided means for delaying the logic pulses from one of said photodetectors, means for either delaying or prolonging the amplitude pulses from the same photodetector, a coincidence analyser for analysing by means of the undelayed logic pulses and said delayed logic pulses whether said delayed or prolonged amplitude pulses are coincident within a predetermined coincidence resolving time with the undelayed or unprolonged amplitude pulses from the other photodetector, and means for determining the number of these coincidences in a plurality of pulse amplitude intervals.

BRIEF DESCRIPTION OF DRAWING

The invention will be described more in detail below with reference to the attached drawing on which

DETAILED DESCRIPTION

Figure 1:
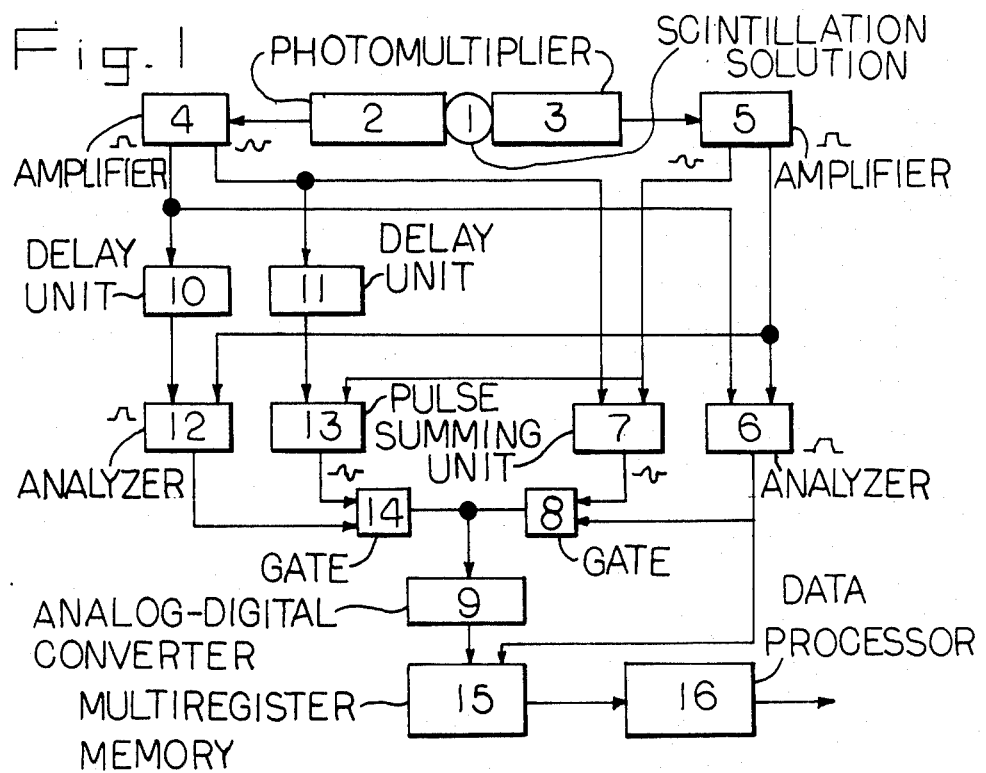
FIG. 1 shows a block diagram of a first embodiment of a liquid scintillation counter according to the invention.

According to the present invention a liquid scintillation counter is proposed by which a chemiluminescence pulse height spectrum is measured alongside with a normal coincidence pulse height spectrum, whereafter the chemiluminescence spectrum can be subtracted from the normal spectrum in order to provide a coincidence spectrum containing real multiphoton events only. The general principle of the invention will be described with reference to the block diagram in FIG. 1. 1 is a scintillation solution viewed by two photomultipliers 2 and 3. The pulses from these photomultipliers are amplified by amplifiers 4 and 5, respectively, that also produce prompt logic pulses used for coincidence analysis and prompt amplitude pulses. The prompt logic pulses from the amplifiers 4 and 5 are directly passed on to a coincidence analyser 6 which produces prompt logic coincidence pulses which are passed on to gating means 8. The prompt amplitude pulses from the amplifiers 4 and 5 are summed in pulse summing means 7 and also passed on to the gate 8. The logic coincidence pulses from the analyser 6 determine if the amplitude pulses are passed through the gate 8 to the analog-digital converter (ADC) 9 or not. Another branch comprises a delay means 10 through which the logic pulses from the amplifier 4 are passed and a delay means 11 through which the amplitude pulses from the amplifier 4 are passed. Both the delay means 10 and 11 delay their pulses for equal periods of time. The delayed logic pulses are thereafter passed on to a coincidence analyser 12 together with prompt logic pulses from the amplifier 5. The analyser 12 produces logic gate pulses indicating random coincidence events. The delayed amplitude pulses are passed on to a pulse summing means 13 together with prompt amplitude pulses from the amplifier 5. The pulse sums produced by 13 are passed on to gating means 14 together with the logic coincidence pulses from the analyser 12, which will open the gate 14 and let the amplitude pulses pass on to the ADC 9. The ADC passes on its digital information to a multiregister memory 15, which is divided into two arrays A and B (not shown). The presence or absence of a prompt coincidence pulse from the analyser 6 determines to which part A or B the digital information is passed. For example, the prompt pulse height spectrum may be stored in the memory array A while the delayed pulse height spectrum may be stored in the array B. The information in the memory A and B is finally read by a data processor 16, which, then, can calculate e.g. count rates in any counting window and/or a value for a quench parameter.

Figure 2:
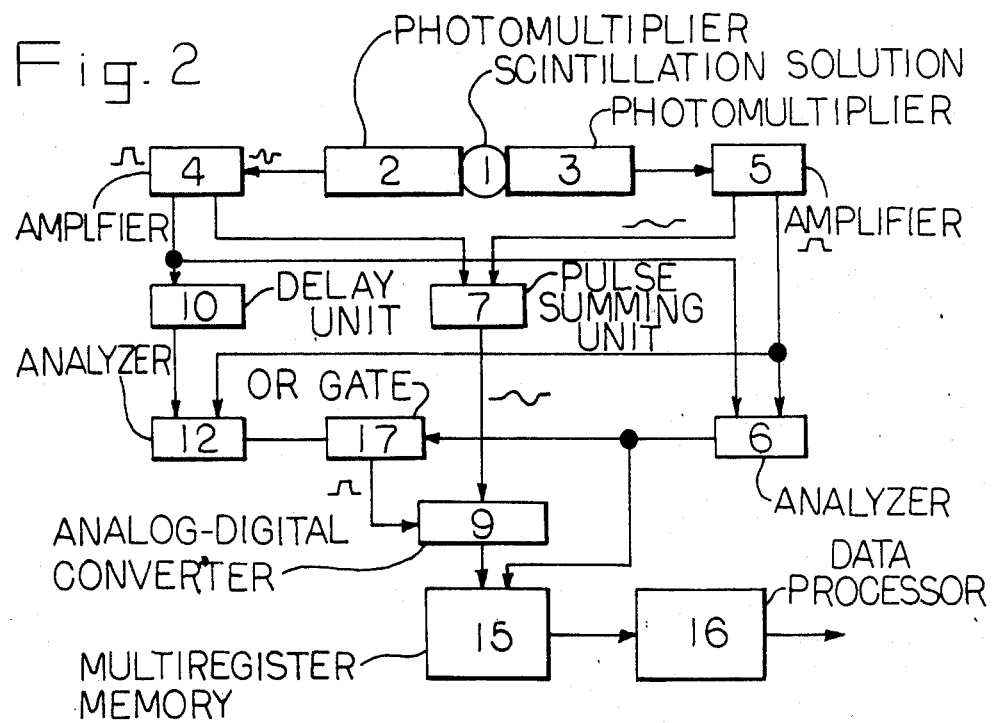
FIG. 2 shows a block diagram of a second embodiment of the liquid scintillation counter according to the invention.

An alternative and simpler version of the embodiment according to FIG. 1 is shown in FIG. 2. Blocks in FIG. 2, identical to the ones in FIG. 1, carry identical reference numerals. The amplifiers 4 and 5 in this embodiment are adapted to stretch the amplitude pulses so that they last as long as the logic pulses are delayed by the delay means 10. The amplitude pulses are added together by the summing means 7 and the sums are passed on to the ADC 9. The coincidence analysers 6 and 12 determine if the two pulses are due to a delayed or a prompt coincidence. The logic coincidence pulses from the analysers 12 and 6 are passed through an OR gate 17 to the ADC 9, which converts only if either or both of the two coincidence pulses are present. Hereafter the functions of the means 15 and 16 are quite similar to the functions already described in conjunction with FIG. 1.

These two embodiments should be considered as examples only. The active electronic parts can be organized in different ways, either simplifying the circuit diagram or making it more complex. The present invention still resides in a liquid scintillation counter for determining a random coincidence pulse height spectrum made up of coincidences between multiple single photon events, by delaying or prolonging the amplitude pulses from at least one of the photomultipliers viewing the same liquid scintillation sample for a fixed time whereafter this pulse is added to the undelayed, or prompt, pulse produced by the other photomultiplier provided the delayed pulse from the first multiplier and the prompt pulse from the second multiplier appear within the coincidence resolving time.

This pulse sum, if approved by the coincidence analyser, is taken to a multichannel analyser with memory storage, in which, at the end of a measuring period, a random coincidence spectrum will be found. At the same time as the said random coincidence spectrum is measured, the prompt, or normal, coincidence spectrum comprising real multiphoton events together with random events is measured and stored in another multichannel analyser memory, according to traditional methods. A correct quench correction parameter and the rate of real multiphoton events in any window may thereafter be calculated from the spectrum remaining when the random coincidence spectrum is subtracted from the prompt coincidence spectrum.

We claim:

1. In a liquid scintillation counter comprising (a) two photodetectors for viewing a scintillation solution in which both real multiphoton events and single photon events take place, (b) means for producing logic pulses and amplitude pulses in correspondence to these events, said amplitude pulses having an amplitude which is a function of the number of photons that reach said photodetectors for each and every of said multiphoton and single photon event, (c) means for adding together said amplitude pulses from said photodetectors to produce first pulse sums, (d) means for either delaying or prolonging the amplitude pulses from one of said photodetectors, (e) means for adding together said delayed or prolonged amplitude pulses from the one of said photodetectors and undelayed amplitude pulses from the other of said photodetectors to produce second pulse sums, (f) means for delaying the logic pulses from said one photodetector, and (g) means for analyzing said delayed logic pulses and undelayed logic pulses from said other photodetector to determine whether said delayed or prolonged amplitude pulses and said undelayed amplitude pulses are coincident within a fixed coincidence resolving time, the improvement comprising an analog-to-digital converter for converting said first pulse sums to digital pulses for storage in a first multichannel analyzer in the form of a prompt coincidence spectrum and said second pulse sums to digital pulses for storage in a second multichannel analyzer in the form of a random coincidence spectrum, and means for subtracting said random spectrum from said prompt spectrum to obtain a coincidence spectrum representing multiphoton events only.

* * * * *